(12) United States Patent
Uchida et al.

(10) Patent No.: US 7,133,170 B1
(45) Date of Patent: Nov. 7, 2006

(54) HOLOGRAPHIC RECORDING MEDIUM

(75) Inventors: Akiyoshi Uchida, Kawasaki (JP); Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/321,159

(22) Filed: Dec. 28, 2005

(30) Foreign Application Priority Data

Sep. 20, 2005 (JP) .............................. 2005-272445

(51) Int. Cl.
*G03H 1/02* (2006.01)
(52) U.S. Cl. .................. 359/3; 430/1; 369/103
(58) Field of Classification Search ............. 359/3–4, 359/7; 430/1–2; 369/103
See application file for complete search history.

(56) References Cited

U.S. PATENT DOCUMENTS 5,477,347 A * 12/1995 Redfield et al. ............... 359/3
2003/0137706 A1 * 7/2003 Rmanujam et al. .......... 359/34
2005/0174917 A1 * 8/2005 Matsumoto et al. ......... 369/103
2005/0219667 A1 * 10/2005 Kihara et al. .................. 359/9

FOREIGN PATENT DOCUMENTS

JP 2004-279942 10/2004

\* cited by examiner

*Primary Examiner*—Leonidas Boutsikaris
(74) *Attorney, Agent, or Firm*—Greer, Burns & Crain, Ltd.

(57) ABSTRACT

A holographic recording medium according to the present invention includes a holographic material layer in which information is to be recorded by irradiating the same region with information light corresponding to the information to be recorded and reference light to read the recorded information. The holographic material layer is divided into a plurality of recording zones by a plurality of light shielding walls. The light shielding wall is formed of a material which does not transmit bleaching light to be applied to the recording zone in which a recording process has been performed and the recorded information is to be fixed.

2 Claims, 26 Drawing Sheets

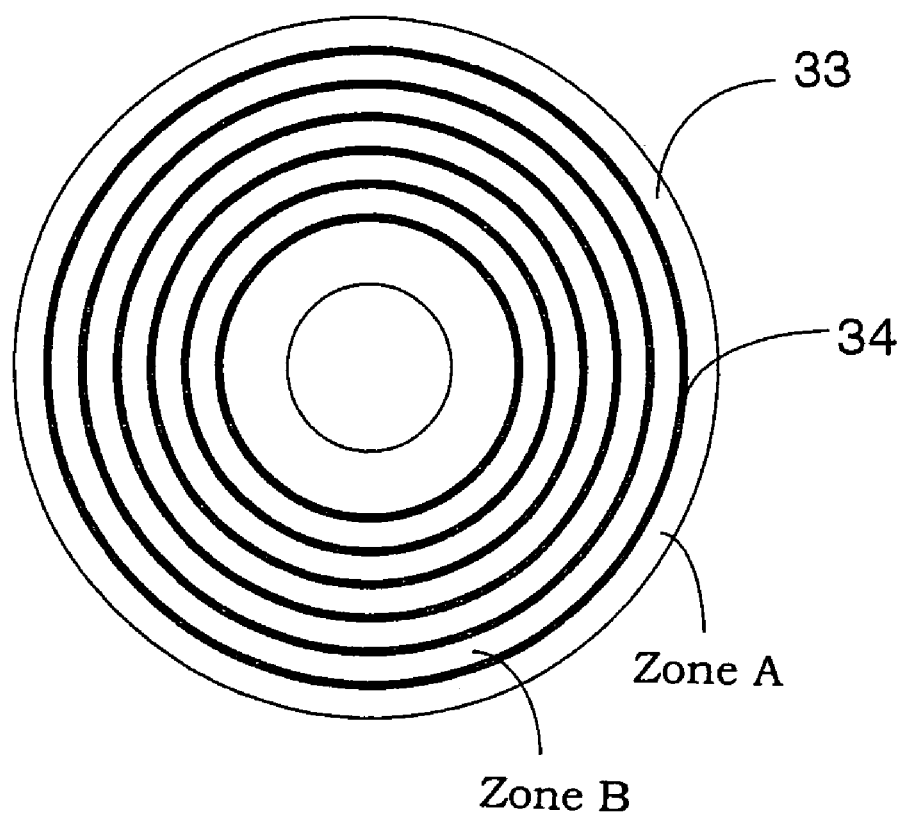

Bleaching light

Enlarge view

US 7,133,170 B1

HOLOGRAPHIC RECORDING MEDIUM

CROSS-REFERENCE TO RELATED APPLICATION

This application is related to Japanese Patent Application No. 2005-272445 filed on Sep. 20, 2005, whose priority is claimed under 35 USC § 119, the disclosure of which is incorporated by reference in its entirety.

BACKGROUND OF THE INVENTION

1. Field of the Invention

The present invention relates to a holographic recording medium and, more particularly, to a holographic recording medium in which a fixing process is performed by applying bleaching light in order to fix holographic recorded data in the medium.

2. Description of the Related Art

As a medium in which large-capacity information can be recorded at high density, there is a holographic recording medium. In the holographic recording medium, page data having capacity of several hundreds of megabytes can multiplex-recorded in the same region. The holographic recording is such that a light beam from a single light source is separated to reference light and information light and the same position on the recording medium is irradiated with the reference light and the information light and an irradiation angle or a wavelength of the reference light is varied to generate different interferences, so that different information is recorded in the same position on the recording medium in piles.

The region in which information is recorded by the holographic recording is a region having a three-dimensional thickness and its optical characteristics are varied even when weak light such as a fluorescent lamp in a room is applied, depending on its material. When the optical characteristics are varied, a reproduction error could be generated. Thus, a medium in which a holographic recording medium is housed in a cartridge or a medium in which a light shielding layer is provided on a holographic recording layer have been proposed (refer to Japanese Unexamined Patent Publication No. 2004-279942).

In addition, according to a holographic recording medium in which data can be written only one time such as a CD-R, in order to stabilize the optical characteristics, after data is recorded with hologram, data fixing process called bleaching is performed. The bleaching is a process such that a region in which holographic recording has been performed is irradiated with white light (referred to as bleaching light) having relatively high intensity which does not destroy its recorded data.

In the recording region irradiated with the bleaching light, reactivity of the recording material is fixed and its optical characteristics are not varied by weak light such as a fluorescent lamp, so that the recorded data can be stably reproduced.

FIGS. 21 and 22 show a schematic constitution of a conventional holographic recording medium. FIG. 21 is a sectional view showing the medium and FIG. 22 is a plan view showing a substrate constitution.

As shown in FIGS. 21 and 22, the holographic recording medium has a constitution in which a resin substrate 12 and a holographic material layer 13 are sandwiched between two glass substrates 10 (10-1, 10-2). The resin substrate 12 includes a reflection film 11 at a boundary with one of the glass substrates 10-1.

When the reference light and the information light are applied at the same time from an upper part of the glass substrate 10-2 of the medium, data is recorded in a region of the holographic material layer 13. After the data is recorded, the bleaching light is applied to fix the recorded data. Thus, the data is fixed in the region of the holographic material layer 13 irradiated with the bleaching light.

FIGS. 23A and 23B show a schematic explanatory diagram of the conventional medium when the bleaching light is applied.

As shown in FIGS. 23A and 23B, when the bleaching light 15 proceeds into the recording region of the holographic material layer 13, it is diffused and diffracted. The bleaching light proceeds to its adjacent region 17 by diffusion and diffraction besides a light beam proceeding to the intended irradiation region 16. As a result, data recorded in the regions (16 and 17) to which the bleaching light 15 proceeded is fixed.

However, when the data is fixed by the bleaching light in the conventional holographic medium, there are following problems.

As shown in FIG. 24, it is assumed that a holographic recording completed region 18 and an unrecorded region 19 are adjacent to each other in the holographic material layer 13. Here, according to the holographic recording completed region 18, it is assumed that data recording with the information light and the reference light has been completed but the bleaching light is not applied yet.

According to the unrecorded region 19, it is assumed that data has not been recorded yet.

As shown in FIG. 25, it is assumed that the bleaching light 15 is applied to the medium in this state to fix the data of the recording completed region 18. At this time, the data can be fixed as intended in the recording completed region 18 which is apart from the unrecorded region 19. However, when the bleaching light 15 is applied to a boundary region with the region 19, since the holographic material layer 13 has a thickness in the vertical direction, it is diffused and diffracted as shown in FIGS. 23A and 23B, so that the bleaching light proceeds beyond a boundary 20. That is, the bleaching light 15 proceeds to regions 16 and 17 and the region 17 irradiated with the bleaching light is spread to the left side of the boundary 20 in FIG. 25.

As a result, as shown in FIG. 26, the data in the unrecorded region 19 in the vicinity of the boundary is also fixed in addition to the data of the intended recording completed region 18. A region 21 shown in FIG. 26 is the data fixed region. That is, although the region 19 is to be used for recording data in the future, since unintended fixing process was performed, the holographic recording cannot be performed any more in that region 19.

Alternatively, in the fixed region in the unrecorded region 19, its diffraction efficiency is extremely lowered and even if the recording and reproducing can be performed thereafter, SNR at the time of recording and reproducing deteriorates.

As described above, when the bleaching process is performed in the conventional holographic recording medium, recording and reproducing characteristics deteriorate and recording capacity is reduced in the boundary region of the recording completed region.

In addition, data is managed by logical and physical addresses in a conventional storage. Since the logical address and the physical address are related at an initial stage, when the unrecorded region becomes a region in which data cannot be recorded, performance is considerably lowered because of its recording error or frequent occurrence of alternating processes. Thus, in the case of the medium in which recording capacity is varied, it is necessary to develop a data management method which is different from the conventional method.

SUMMARY OF THE INVENTION

The present invention provides a holographic recording medium including a holographic material layer in which information is to be recorded by irradiating the same region with information light corresponding to the information to be recorded and reference light to read the recorded information, wherein the holographic material layer is divided into a plurality of recording zones by a plurality of light shielding walls, and the light shielding wall is formed of a material which does not transmit bleaching light irradiated for being fixed the recorded information to the recording zone in which a recording process has been performed.

BRIEF DESCRIPTION OF THE DRAWINGS

FIG. 2 is a plan view showing the holographic recording medium according to one embodiment of the present invention;

DESCRIPTION OF THE PREFERRED EMBODIMENTS

Figure 1A:
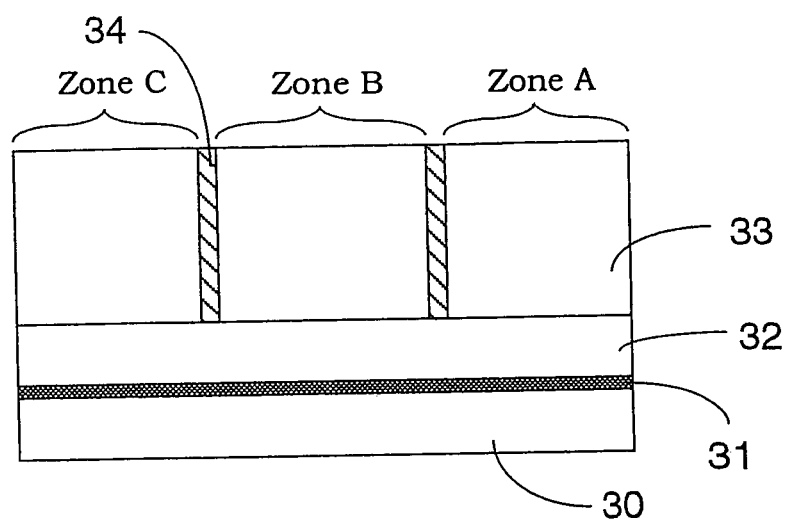
FIGS. 1A and 1B are sectional views each showing a holographic recording medium according to one embodiment of the present invention.

The present invention is a holographic recording medium in which bleaching light can be prevented from proceeding to an unintended holographic recording region.

The present invention provides a holographic recording medium including a holographic material layer in which information is to be recorded by irradiating the same region with information light corresponding to the information to be recorded and reference light to read the recorded information, wherein the holographic material layer is divided into a plurality of recording zones by a plurality of light shielding walls, and the light shielding wall is formed of a material which does not transmit bleaching light to be applied to the recording zone in which a recording process has been performed and the recorded information is to be fixed.

Preferably, the light shielding wall reflects or absorbs the bleaching light so that the bleaching light proceeds only to a recording zone in which the recorded information is to be fixed, and the bleaching light does not proceed to a recording zone adjacent to the recording zone in which the recorded information is to be fixed.

Herein, the light shielding wall may include either acrylic or polycarbonate material.

Preferably, the holographic material layer is formed on a disk-shaped or polygonal substrate, the light shielding wall is formed on the substrate and in the holographic material layer in a latticed pattern, and the recording zone is a region surrounded by the lattice-shaped light shielding walls. Herein, examples of the substrate may include a glass substrate, a resin substrate and the like.

The substrate may be a laminated substrate formed by laminating various types of substrates. In the later-described embodiment, a structure including a glass substrate and a resin substrate provided with a reflection film is described as one example of the substrate (refer to FIG. 1).

Preferably, the holographic material layer is formed on a disk-shaped or polygonal substrate, the light shielding wall is formed on the substrate and in the holographic material layer, a waveguide layer to introduce the bleaching light is provided between the substrate and the holographic material layer, and the waveguide layer is formed so that the applied bleaching light is led to each recording zone of the holographic material layer.

Preferably, the holographic recording medium includes a light shielding member provided on the holographic material layer and the light shielding wall, and the light shielding member is any one of a thin film which can be removed from/attached to each recording zone, a movable member which can control permission and prohibition of light proceeding to the holographic material layer in each recording zone, and a liquid crystal element which can vary light transmission to the holographic material layer in each recording zone.

An embodiment of the present invention will be described with reference to the drawings hereinafter. In addition, the present invention is not limited to the embodiment.

(Structure of Holographic Recording Medium)

Figure 1B:
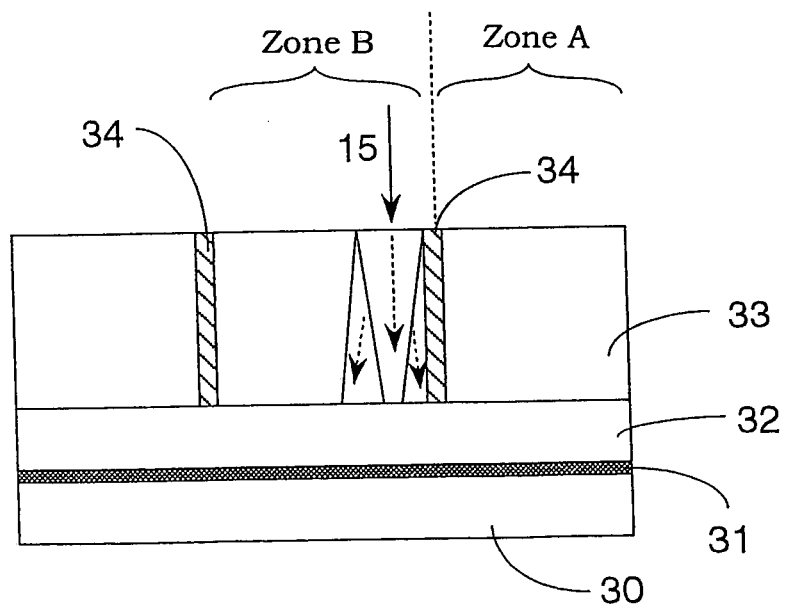

FIGS. 1A and 1B are sectional views each showing a holographic recording medium according to one embodiment of the present invention.

Referring to FIGS. 1A and 1B, the medium according to the present invention includes a holographic material layer 33 and a light shielding wall 34 on a laminated structure in which a glass substrate 30, a reflection film 31, and a resin substrate 32 are laminated in this order.

Figure 21:
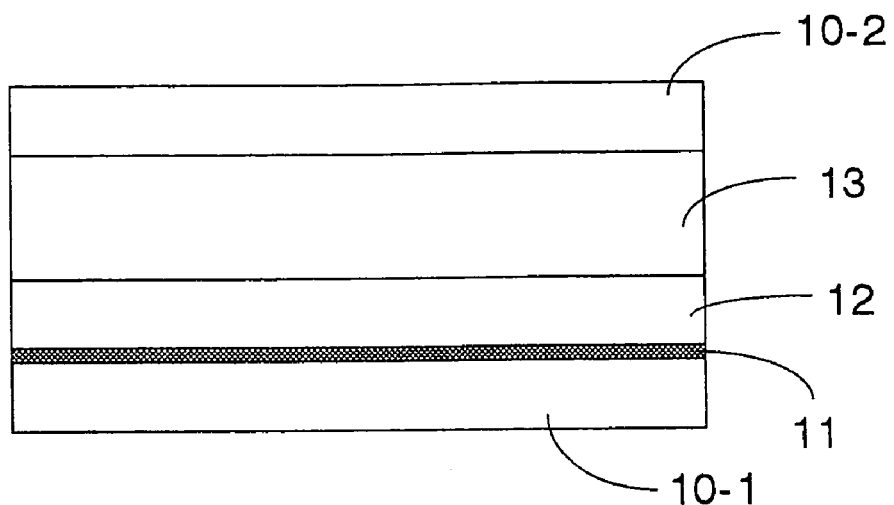
FIG. 21 is a sectional view showing a conventional holographic recording medium.
Figure 22:
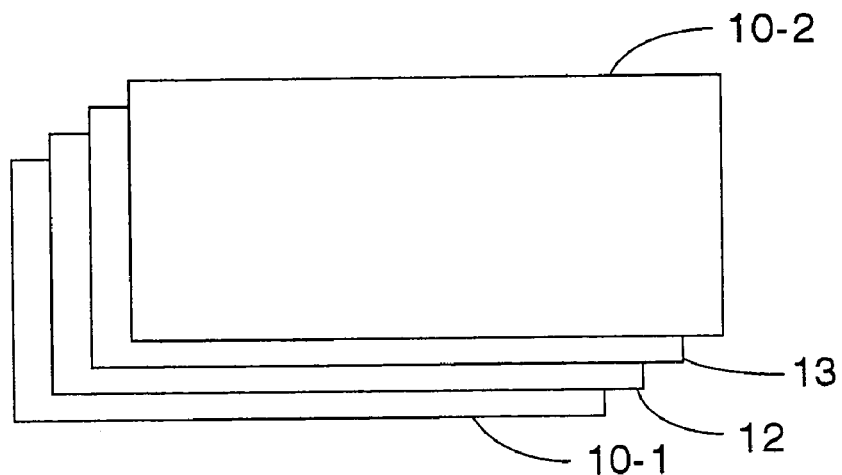
FIG. 22 is an explanatory view showing a constitution of the conventional holographic recording medium.

The above medium is different from the conventional medium shown in FIG. 21 in that it includes the light shielding walls 34. The light shielding walls 34 are provided in the holographic material layer 33 at regular intervals (about several millimeters, for example) so as to divide the holographic material layer 33 into a plurality of regions (referred to as a recording zone or a zone simply hereinafter).

The holographic recording is volume recording and the holographic material layer 33 has a thickness of about several millimeters in general, in which information is multiplex-recorded. However, its thickness depends on its specification.

The multiplex recording is performed with information light and reference light outputted from a single light source and split by a beam splitter. The information light is light corresponding to information to be recorded and it is modulated by a special light modulator (SLM) having two-dimensional special information corresponding to the information to be recorded.

Although the reference light is used for reading recorded information, at the time of recording, it is also used for recording the information in the holographic material layer 33 by interference with the information light applied to the same region.

In a recording process, the information to be recorded is recorded as two-dimensional page data when the information light and the reference light are applied to the same region of the holographic material layer.

In addition, when the reference light whose angle is varied is applied to the same region in which the data has been recorded, multiplex recording of plural pieces of two-dimensional page data can be performed, for example.

In addition, this medium according to the present invention is a so-called write-once medium which is fixed by bleaching (fixing process) so that recorded data is not erased and not varied due to a chemical reaction.

Figure 3:
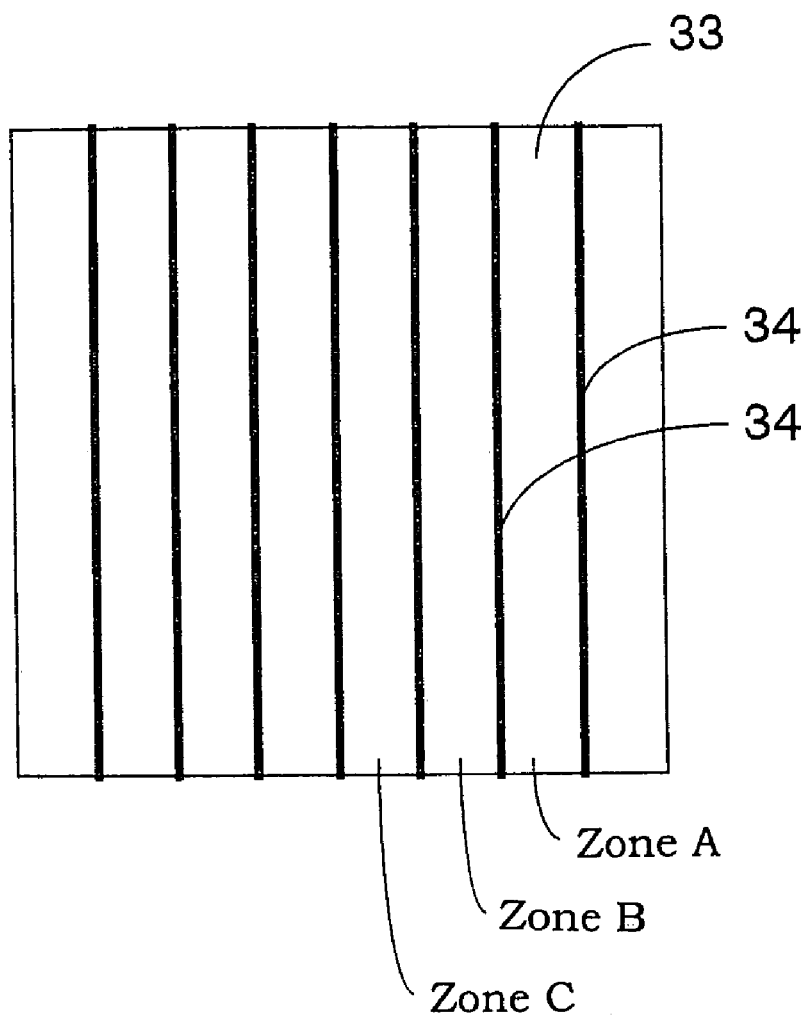
FIG. 3 is a plan view showing a holographic recording medium according to one embodiment of the present invention.

FIG. 1A shows a state in which the holographic material layer 33 is divided into three recording zones (A, B and C)
by the light shielding walls 34. FIG. 3 is a plan view showing the holographic material layer taken from above in FIGS. 1A and 1B.

For example, when information is recorded in the zone B, reference light and information light outputted from a single light source are applied to the zone B and plural pieces of information are multiplex-recorded in the holographic material layer 33 of the zone B by varying an irradiation angle of the reference light.

The light shielding wall 34 does not transmit bleaching light 15 and it is formed of a material which does not transmit the bleaching light 15, so that the bleaching light 15 does not proceed to the adjacent recording zone. The bleaching light 15 is to fix the already recorded information in the recording zone.

For example, when the zone B shown in FIG. 1B is irradiated with the bleaching light 15, the bleaching light 15 reflects when it meets the light shielding wall 34 or it is absorbed by the light shielding wall 34, so that it does not enter the zone A which is the adjacent region.

In the case of FIG. 1B, although the bleaching light 15 is diffused in the zone B in a left direction, it does not enter the zone A on the right side of the light shielding wall 34 because of the light shielding wall 34.

Thus, the light shielding wall 34 which does not transmit the bleaching light 15 is made of a colored acrylic resin, for example.

In addition, the light shielding wall may be made by mixing a material such as carbon graphite to the above resin and coloring the mixture, thereby transmitting no bleaching light. In general, when it absorbs the bleaching light, the color is preferably black.

In addition, the holographic material layer 33 is formed of a material mainly containing (meta)acrylate, styrene, vinyl ether, epoxy and the like. Depending on its material, a chemical reaction generated when the bleaching light is applied could be spread in the region to which the bleaching light does not directly proceed.

Figure 23A:
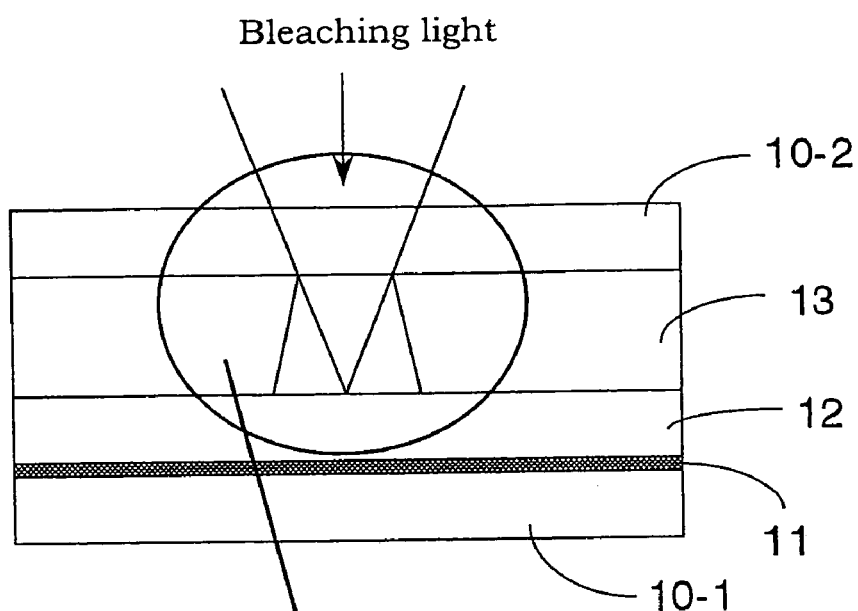
FIGS. 23A and 23B are explanatory views each showing bleaching light in the conventional holographic recording medium.
Figure 23B:
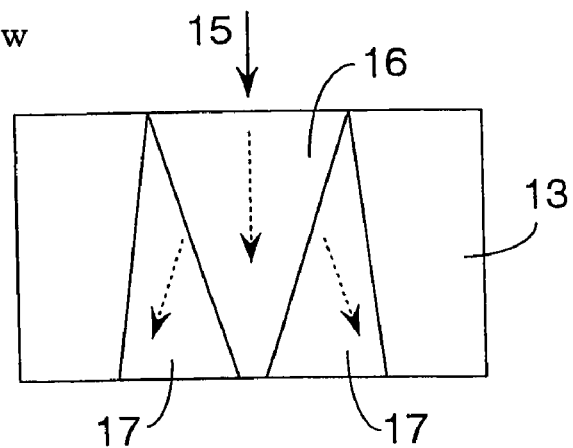
Figure 24:
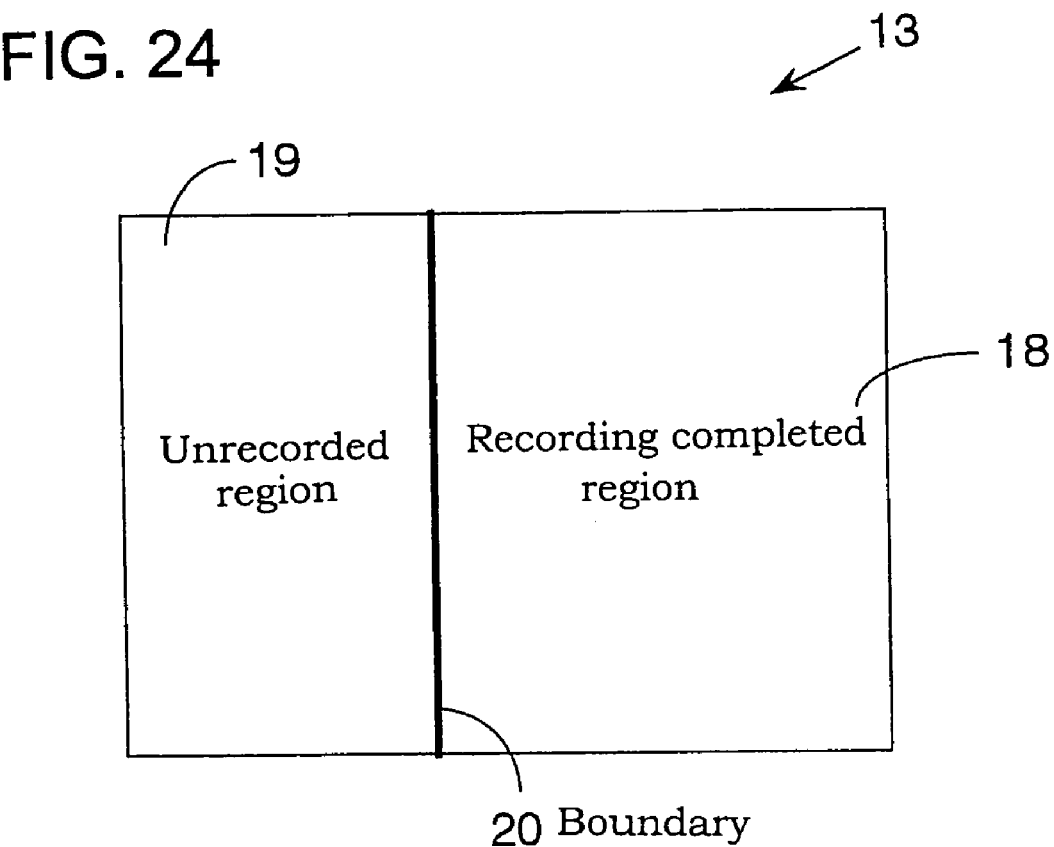
FIG. 24 is an explanatory view showing a recording region of the conventional holographic recording medium.
Figure 25:
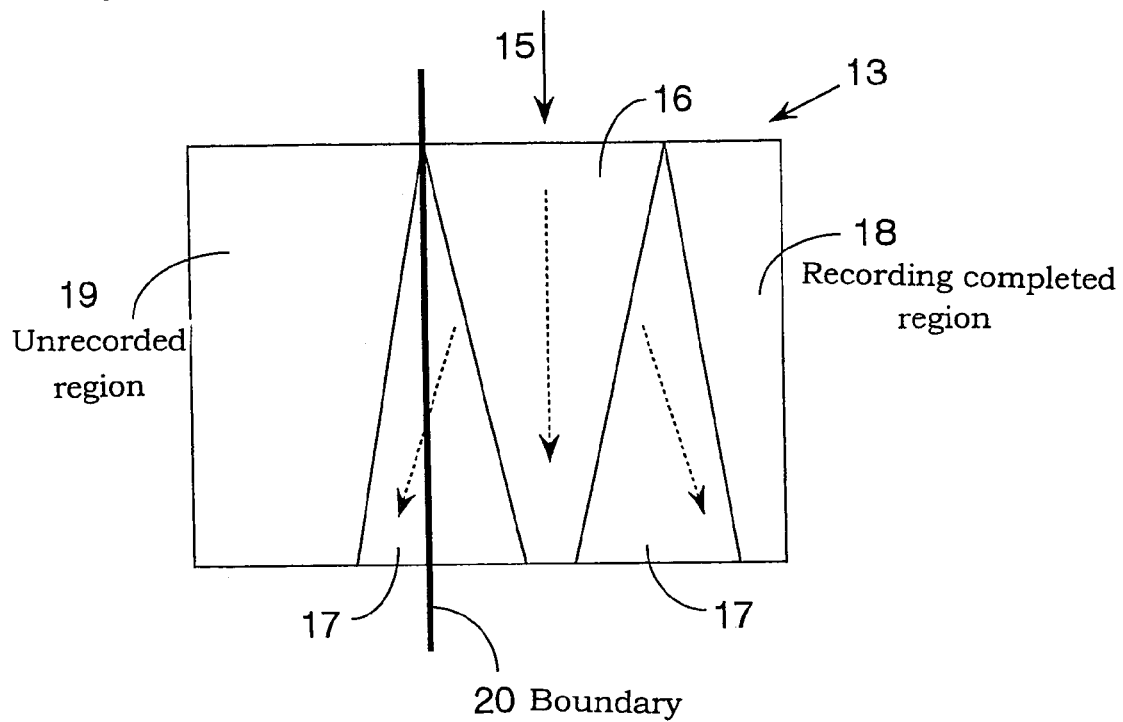
FIG. 25 is an explanatory view showing proceeding of the bleaching light of the conventional holographic recording medium.
Figure 26:
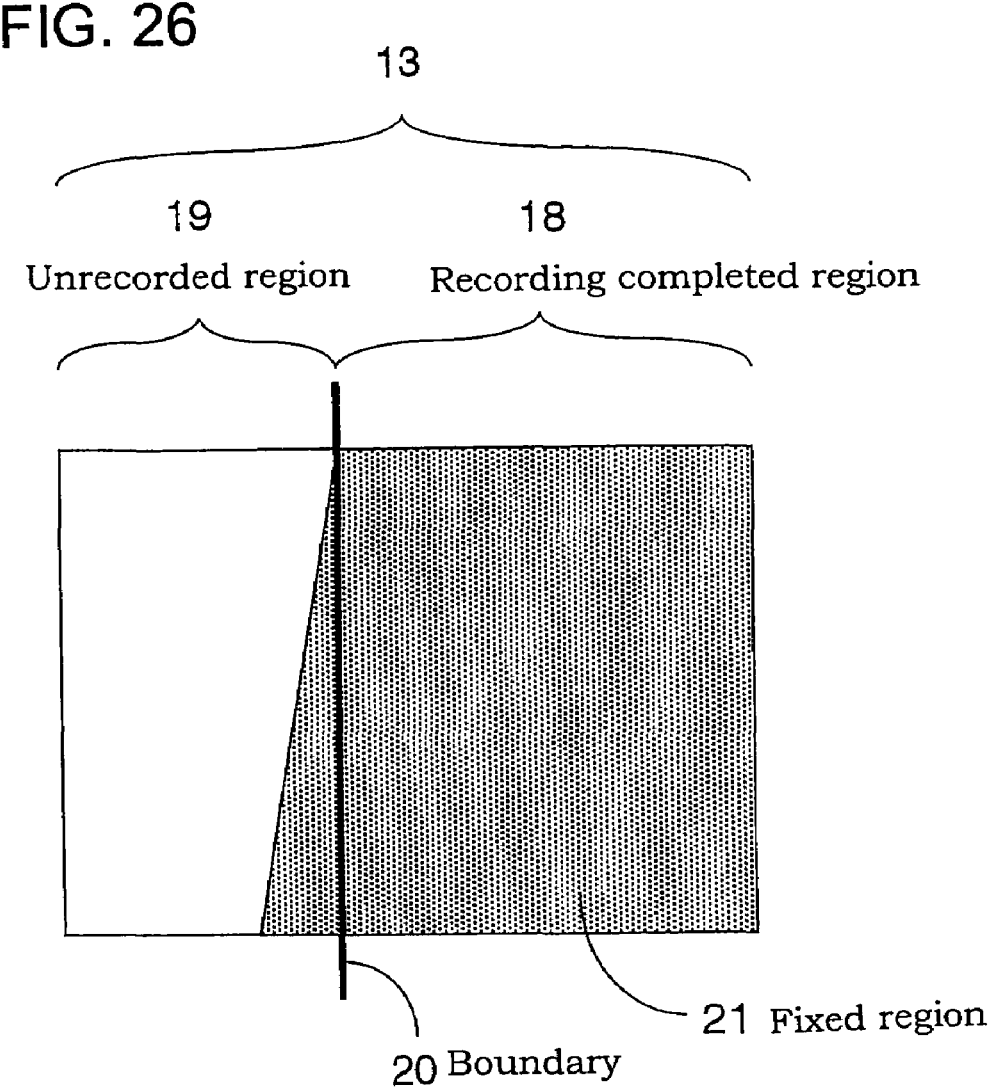
FIG. 26 is an explanatory view showing a fixed region of the conventional holographic recording medium.

That is, diffusion could occur in the fixed region due to the chemical reaction of the holographic material layer 33 other than the diffusion in the fixed region due to scattering or diffraction of the bleaching light as shown in FIGS. 23A and 23B.

Thus, it is preferable that the light shielding wall 34 has a property (which is inactive to the chemical reaction) to prevent the fixed region from being diffused by the chemical reaction. For example, the acrylic resin or polycarbonate is inactive to the chemical reaction.

In FIGS. 1A and 1B, the substrate 30, the reflection film 31 and the resin substrate 32 may be formed of the same material as in the conventional medium shown in FIG. 21.

In addition, although it is not shown in FIGS. 1A and 1B, a glass substrate may be provided on the holographic material layer 33 as shown in FIG. 21.

When it is assumed that the zone B is a recording completed region and the zone A is an unrecorded region in FIG. 1B, the zone B is irradiated with the bleaching light 15 to fix the recorded data in the zone B. At this time, although the bleaching light 15 is diffused in the right and left direction in the zone B, it is prevented from further being diffused in the right direction by the light shielding wall 34, so that the bleaching light 15 is not diffused in the zone A as the unrecorded region.

Therefore, the unrecorded region (zone A) is prevented from being fixed by mistake. Then, when data is recorded in the unrecorded region (zone A), the data can be recorded in good SNR. That is, good recording and reproducing characteristics of the unrecorded region can be assured and recording capacity in which stable recording and reproducing can be performed as designed can be assured.

Meanwhile, the medium shown in FIG. 3 according to the present invention is a polygonal (rectangular in FIG. 3) card-shaped medium, and in order to fix the data in a certain recording zone, it is necessary to control a position of an optical component so that the bleaching light 15 is applied only to that recording zone. In general, the recording and reproducing device to perform a recording process and a reproducing process in the holographic material layer mainly includes optical components such as a light source, a beam splitter, a special light modulator (SLM), an objective lens, and a photodetector (CCD), so that it is necessary to provide a position adjusting mechanism (actuator) for relative alignment between each recording zone and a light source of the bleaching light when the medium according to the present invention is bleached. The light source of the bleaching light may be separately provided from the light source of the reference light and the like.

In addition, in the recording process with the reference light and the information light, it is also necessary to control the position of the optical component so that only one recording zone is irradiated with a recording spot as will be described below (refer to FIG. 13).

(Construction Example of Holographic Recording Medium)

FIG. 2 and the like show a plan view and a sectional view showing a holographic recording medium according to an embodiment of the present invention.

The medium shown in FIG. 2 is a disk-shaped rotation medium, in which light shielding walls 34 are provided at regular intervals concentrically and a holographic material layer 33 is provided between them. In this case, the donut-shaped region between the concentrically adjacent light shielding walls 34 is one recording zone. In addition, the intervals between the light shielding walls 34 may be the same or may be different.

Figure 4:
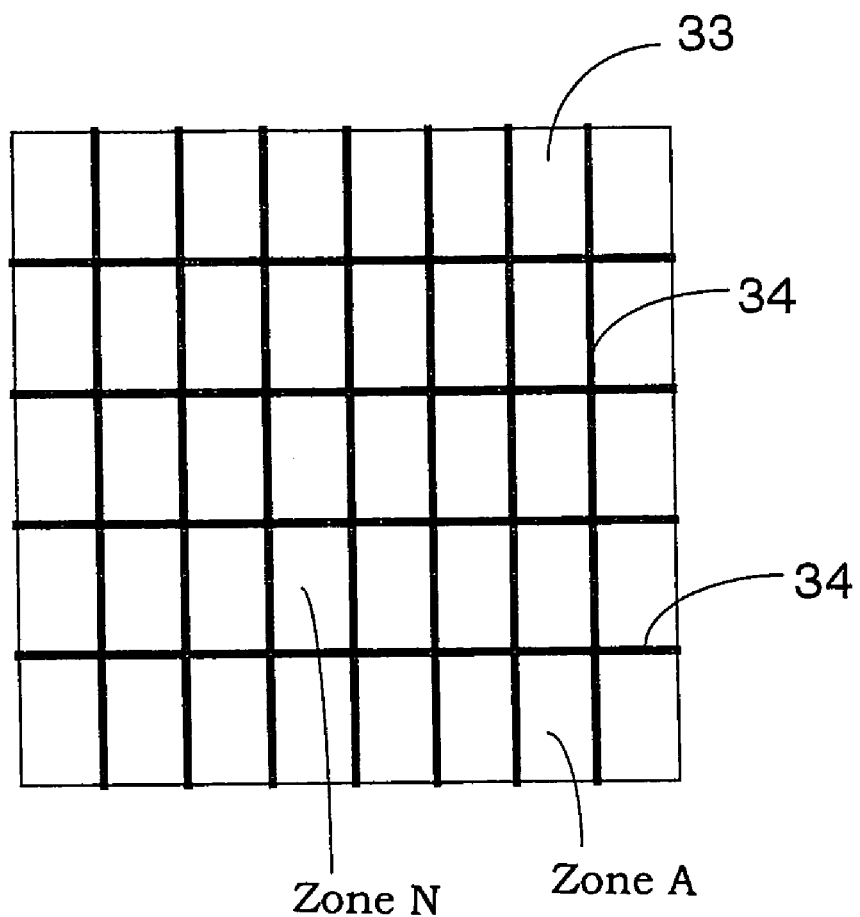
FIG. 4 is a plan view showing a holographic recording medium according to one embodiment of the present invention.

A medium shown in FIG. 4 is a rectangular card-shaped medium similar to FIG. 3, and lattice-shaped light shielding walls 34 are formed in a holographic material layer 33. In this case, the rectangular region surrounded by the lattice-shaped light shielding walls 34 serves as one recording zone.

A medium shown in FIG. 5 is a medium in which a waveguide layer 35 is added to the medium shown in FIG. 1. The waveguide layer 35 is provided between a resin substrate 32 and a holographic material layer 33. The waveguide layer 35 transmits the bleaching light and leads it to the holographic material layer 33, and it is formed of a material such as transparent acrylic material or olepin material. The bleaching light 15 is introduced into the waveguide layer 35.

Figure 5A:
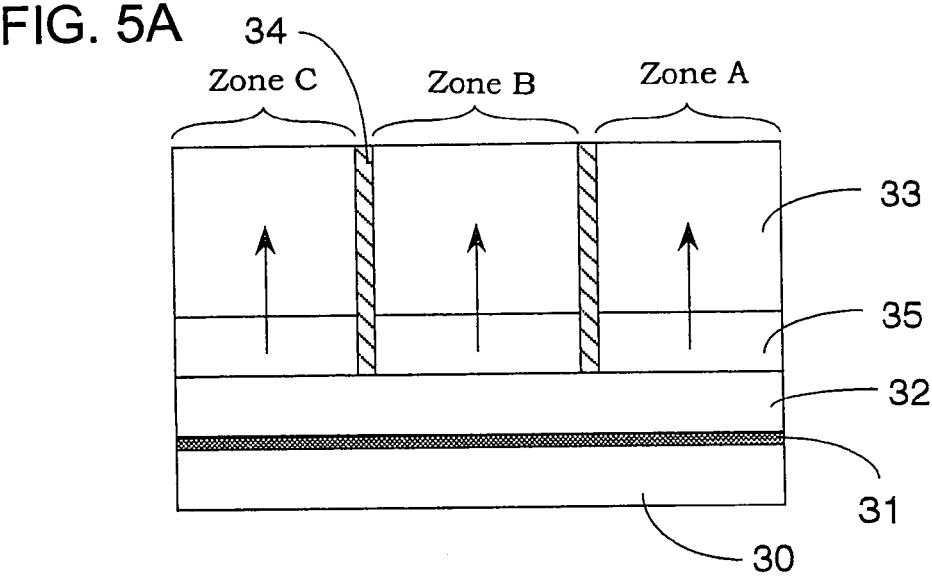
FIGS. 5A and 5B are sectional views each showing a holographic recording medium according to one embodiment of the present invention.
Figure 5B:
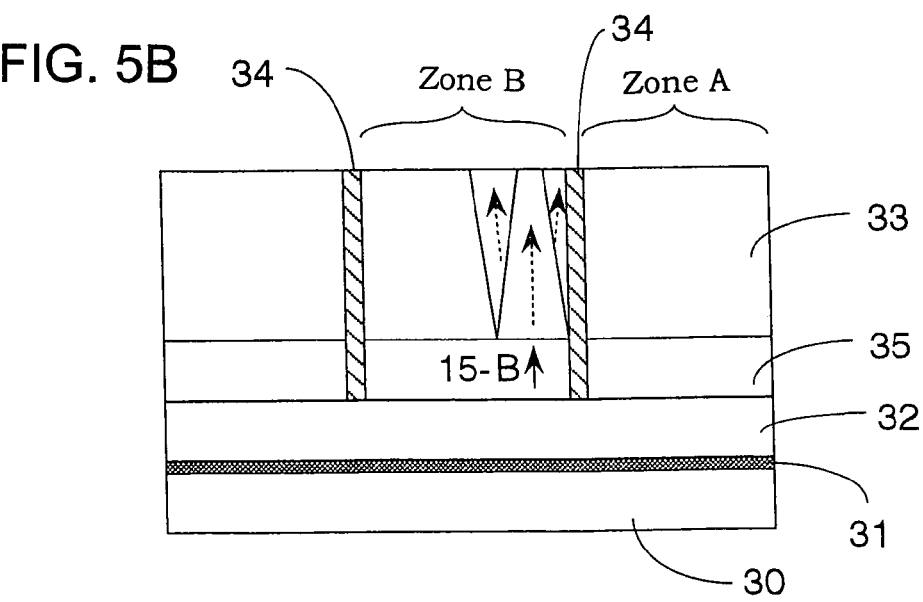
Figure 6:
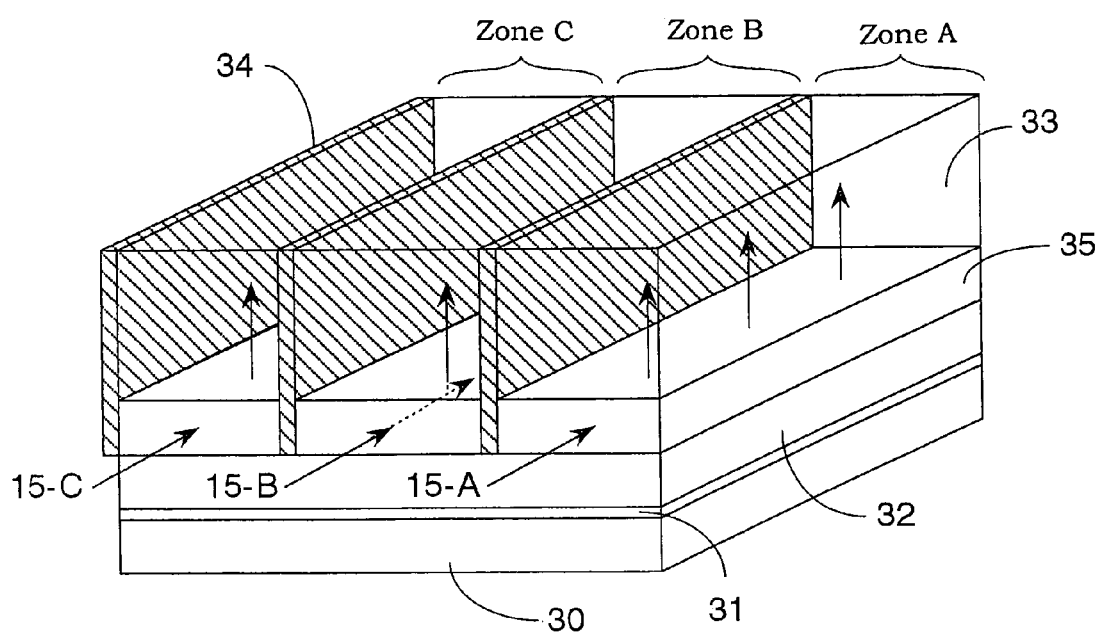
FIG. 6 is a perspective view showing the holographic recording medium according to one embodiment of the present invention.

FIG. 6 is a perspective view showing the medium shown in FIGS. 5A and 5B, and arrows show proceeding directions of bleaching lights 15-A, 15-B and 15-C. Each bleaching light 15 is inputted into a side face of the waveguide layer 35 of each recording zone. For example, when the information recorded in the zone C is to be fixed, the bleaching light 15-C is inputted to the side face of the waveguide layer of the zone C.

The inputted bleaching light 15-C proceeds into the waveguide layer 35 and also proceeds to the upper holographic material layer 33 by scattering and reflection. The holographic recorded data in the zone is fixed by this upward bleaching light 15.

FIG. 5B shows that the bleaching light 15-B proceeds upward in the zone B. Here, although the bleaching light 15-B is diffused in the zone B, it does not proceed to the adjacent zone A because the light shielding wall 34 exists in the right side.

Therefore, when it is assumed that the zone B is a recording completed region and the zone A is an unrecorded region in FIGS. 5A and 5B, the recorded data in the zone B is fixed by the bleaching light 15-B and the zone A is prevented from being fixed because the bleaching light does not proceed to the adjacent zone A in which data is not recorded.

Figure 7:
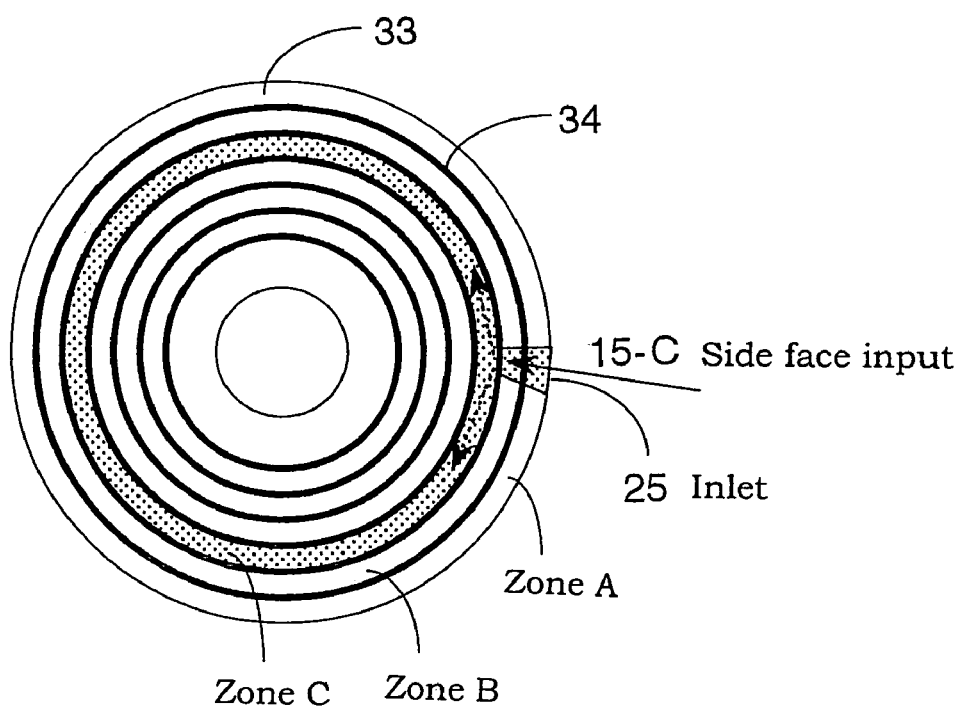
FIG. 7 is a plan view showing a holographic recording medium according to one embodiment of the present invention.

A medium shown in FIG. 7 is a disk-shaped rotation medium which includes a waveguide layer 35 like in FIGS. 5A and 5B. In this case, the waveguide layer 35 is formed under each recording zone of a donut-shaped holographic material layer 33 and separated by a light shielding wall 34 every recording zone. In addition, the bleaching light 15 is inputted from an inlet 25 provided on a side face of the medium. For example, the inlet 25 is provided in each zone and a waveguide to connect each inlet to each zone optically is provided. The bleaching light inputted to the inlet 25 passes through the waveguide layer 35 connected to the inlet and it is led to the connected recording zone.

Figure 8:
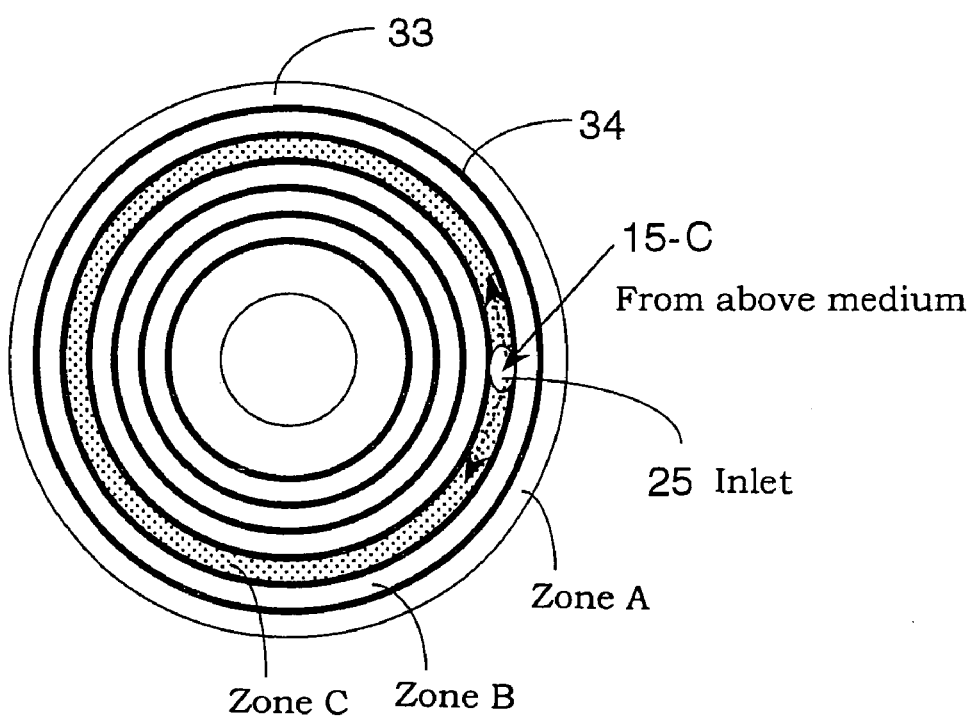
FIG. 8 is a plan view showing a holographic recording medium according to one embodiment of the present invention.

A medium shown in FIG. 8 is a disk-shaped medium and includes an inlet 25 for each zone, to which the bleaching light 15 is inputted from an upper part of the medium. The bleaching light 15 inputted from the inlet 25 of a certain zone is led to a waveguide layer 35 of the zone and scattered in a holographic material layer 33 of the zone and data recorded in the zone is fixed. The inlet 25 may be provided under the medium on the side of a substrate 30 instead of being provided above the medium on the side of the holographic material layer.

Figure 9:
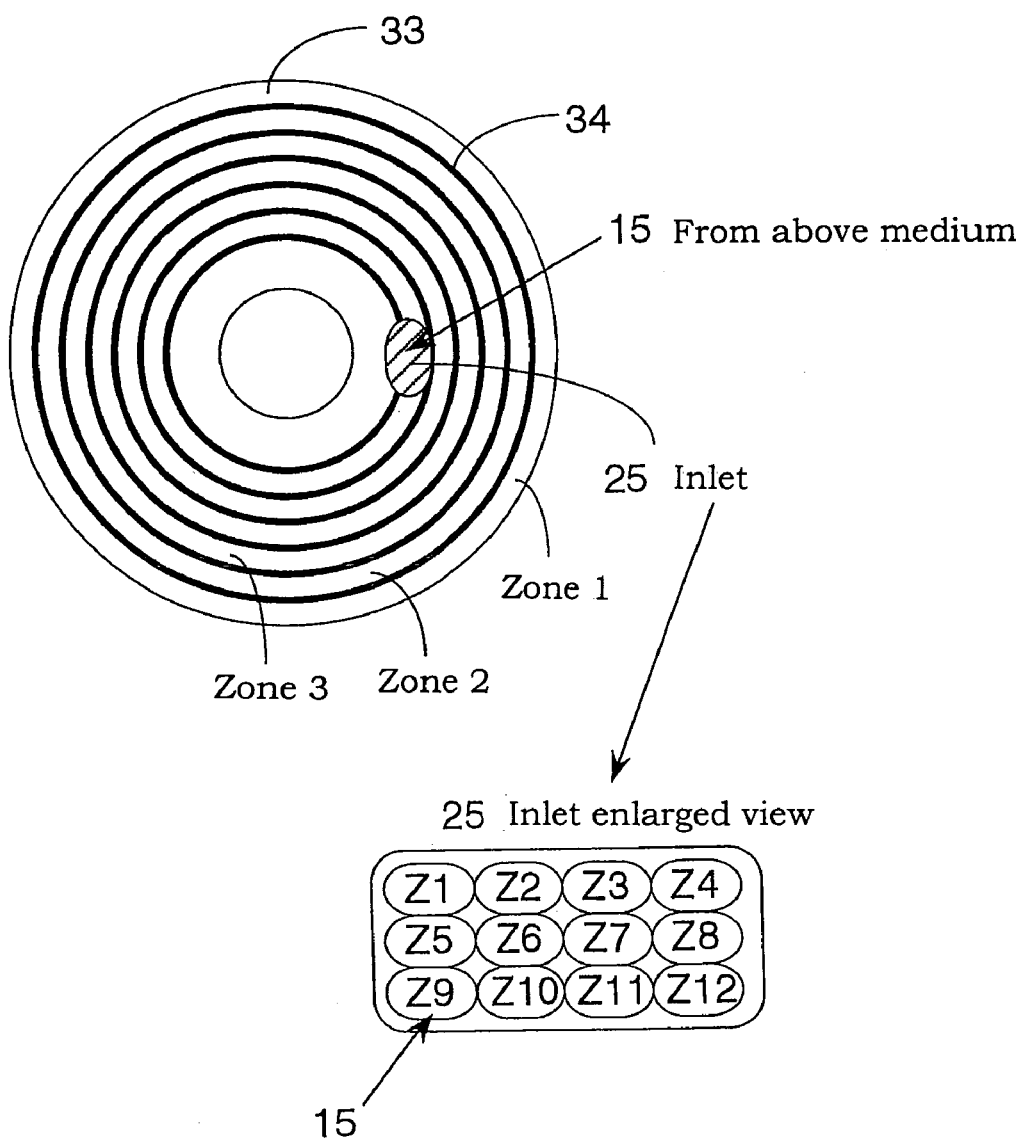
FIG. 9 is a plan view showing a holographic recording medium according to one embodiment of the present invention.

A medium shown in FIG. 9 is a disk-shaped medium and includes an inlet 25 for each zone, to which bleaching light 15 is inputted from an upper part of the medium. FIG. 9 shows a case in which the plural inlets are collected to one place. When the inlets 25 are enlarged, each of the small inlets (Z1 to Z12) is provided for each zone as shown in FIG. 9. If the number of zones is 12, the inlet Z1 is for the zone 1 and the inlet Z12 is for the zone 12.

For example, the inlet Z5 is connected to the zone 5 through a waveguide layer 35 and data in the zone 5 is fixed by the bleaching light inputted from the inlet Z5. The position of the inlets 25 is not limited to a position in the vicinity of the inner periphery as shown in FIG. 9, and it may be provided other than in the recording zone or in the vicinity of an outer periphery of the medium.

In this case, the recording and reproducing device has a position adjustment mechanism to irradiate the inlet of the zone to be fixed with the bleaching light 15.

Several embodiments for the medium including the waveguide layer have been described. When the waveguide layer is provided, the mechanism to adjust the irradiation position with the bleaching light can be simplified.

Figure 10A:
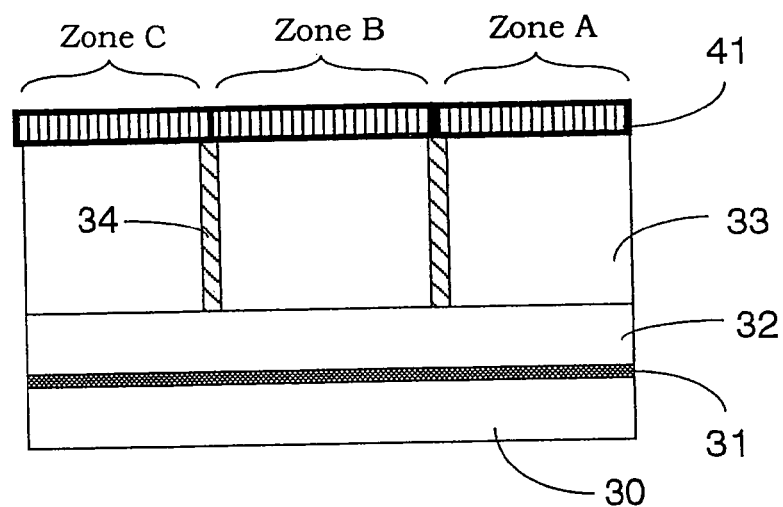
FIGS. 10A and 10B are sectional views each showing a holographic recording medium according to one embodiment of the present invention.
Figure 10B:
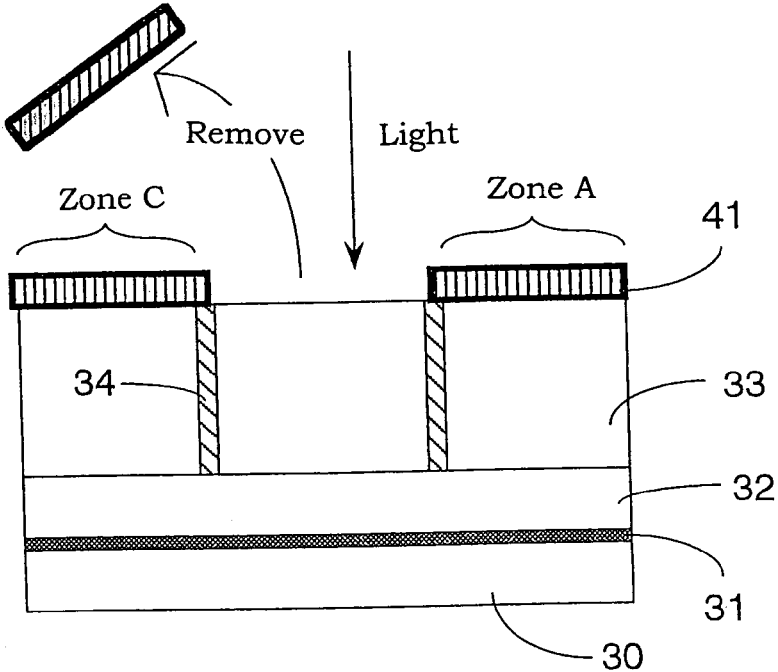

According to a medium shown in FIGS. 10A and 10B, a light shielding member 41 is provided on a holographic material layer 33. The light shielding member 41 prevents the holographic material layer 33 from causing a chemical reaction due to external light such as a fluorescent lamp while the medium is stored and the like, and it may be formed of an acrylic material or a polycarbonate material.

Alternatively, it is preferable that a thin film which can be removed from/attached to each recording zone is used so that a recording process and a fixing process can be performed in each recording zone.

FIG. 10A shows a state when the medium is shipped. For example, the thin film (light shielding member) 41 which covers the holographic material layer 33 is attached to each recording zone. Thus, the holographic material layer 33 can be protected while it is stored.

FIG. 10B shows a state at the time of recording process and at the time of fixing process by the bleaching light. In this case, after the light shielding thin film 41 is removed from the zone B in which the data is to be recorded or fixed, for example, the zone B is irradiated with information light and reference light. Alternatively, the fixing process is performed in the zone B by irradiation of the bleaching light. After the fixing process by the bleaching light, since the data is fixed and not erased, it is not necessary to attach the light shielding thin film 41 again. In this case, a tool or a mechanism to remove the light shielding thin film 41 is needed.

Figure 11A:
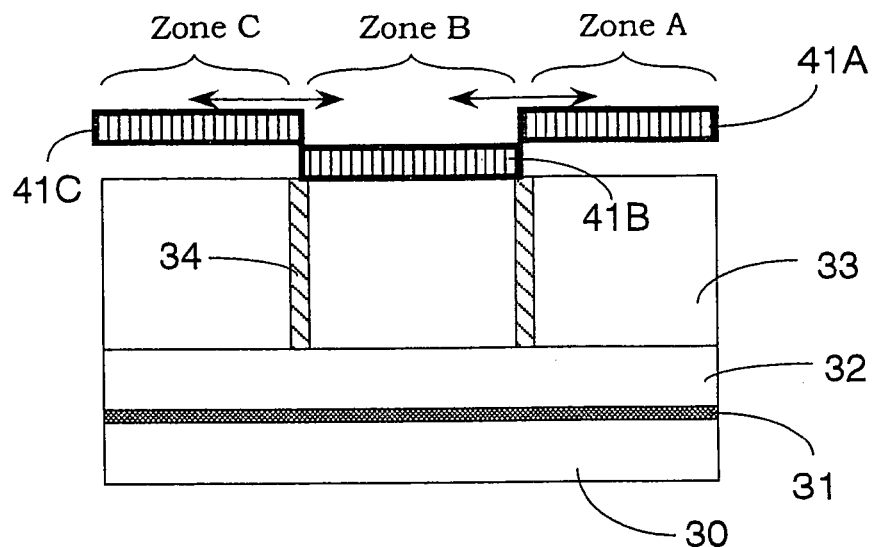
FIGS. 11A and 11B are sectional views each showing a holographic recording medium according to one embodiment of the present invention.
Figure 11B:
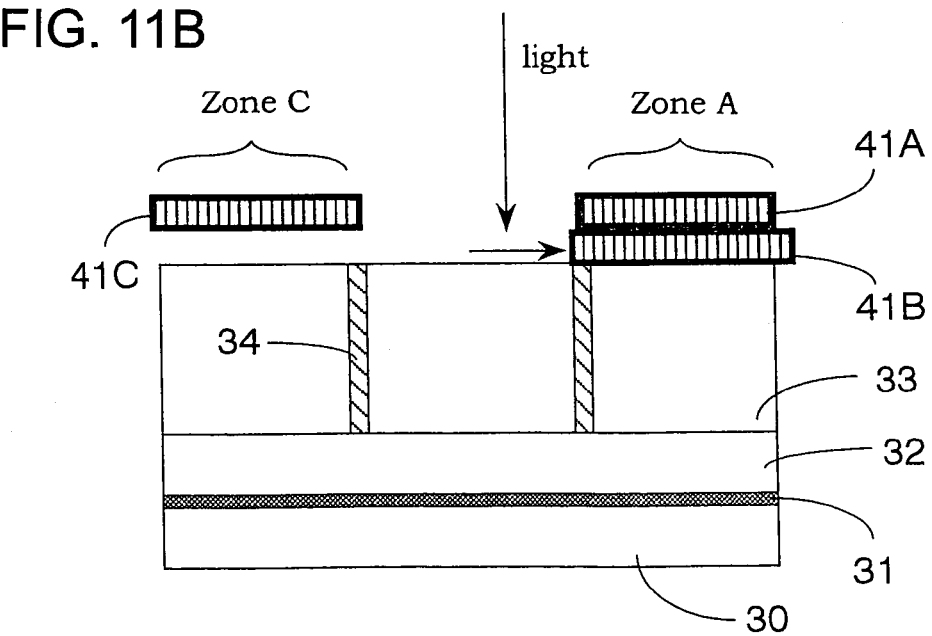

FIGS. 11A and 11B show a medium in which a light shielding member 41 is provided on a holographic material layer 33 in each zone like in FIGS. 10A and 10B as a slidable member so that the zone can be opened or closed. Since the slidable member 41 is provided every recording zone, the light is permitted to proceed or prohibited from proceeding to the holographic material layer in each recording zone.

The light shielding members (41A, 41B and 41C) can be slid in the right and left direction of the drawing. When the light shielding member 41B of the zone B to be irradiated with the light is slid, for example, the light can be transmitted to the holographic material layer 33 of the zone B. In this case, it is necessary to provide a mechanism to slide the light shielding member 41 in each zone.

FIG. 11A shows a state in which the medium is shipped and FIG. 11B shows a state in which the recording process or the fixing process is performed to the zone B.

Figure 12A:
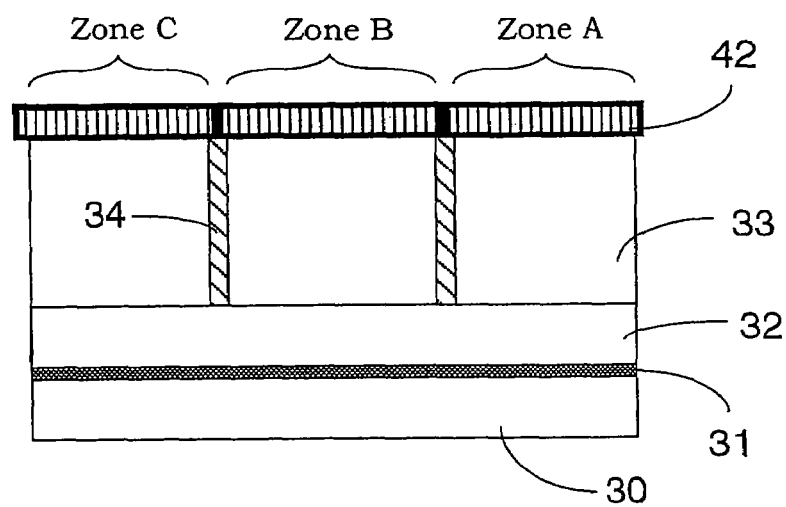
FIGS. 12A and 12B are sectional views each showing a holographic recording medium according to one embodiment of the present invention.
Figure 12B:
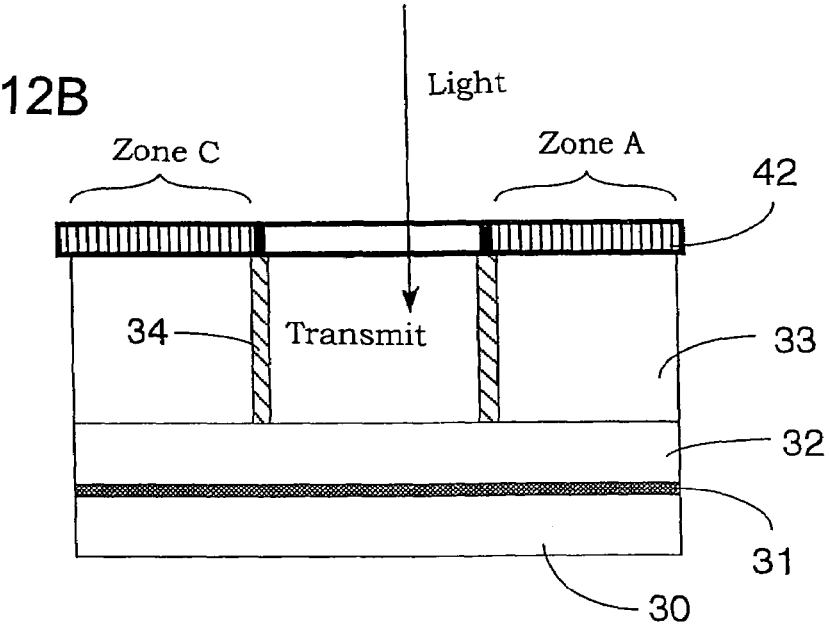

FIGS. 12A and 12B show an embodiment in which a liquid crystal element 42 is used for a light shielding member 41. The liquid crystal element 42 varies light transmission to a holographic material layer in each recording zone. That is, it controls shielding and transmitting of the reference light or the bleaching light. Therefore, it is necessary to provide a mechanism to drive the liquid crystal element 42.

FIG. 12A shows a state in which the medium is shipped and the liquid crystal element 42 stably shields the light. FIG. 12B shows a state in which the liquid crystal element 42 in a zone B is driven to transmit the light to the zone B.

The embodiments in which the light shielding member 41 is provided on the holographic material layer 33 have been described. In this case, since the light shielding member 41 is provided, in addition to the effect that the bleaching light is prevented from being diffused to the unrecorded region by the light shielding wall 34, a chemical reaction of the holographic material layer due to external light can be prevented at the time of storage.

(Recording Process and Bleaching Process According to the Present Invention)

Figure 15:
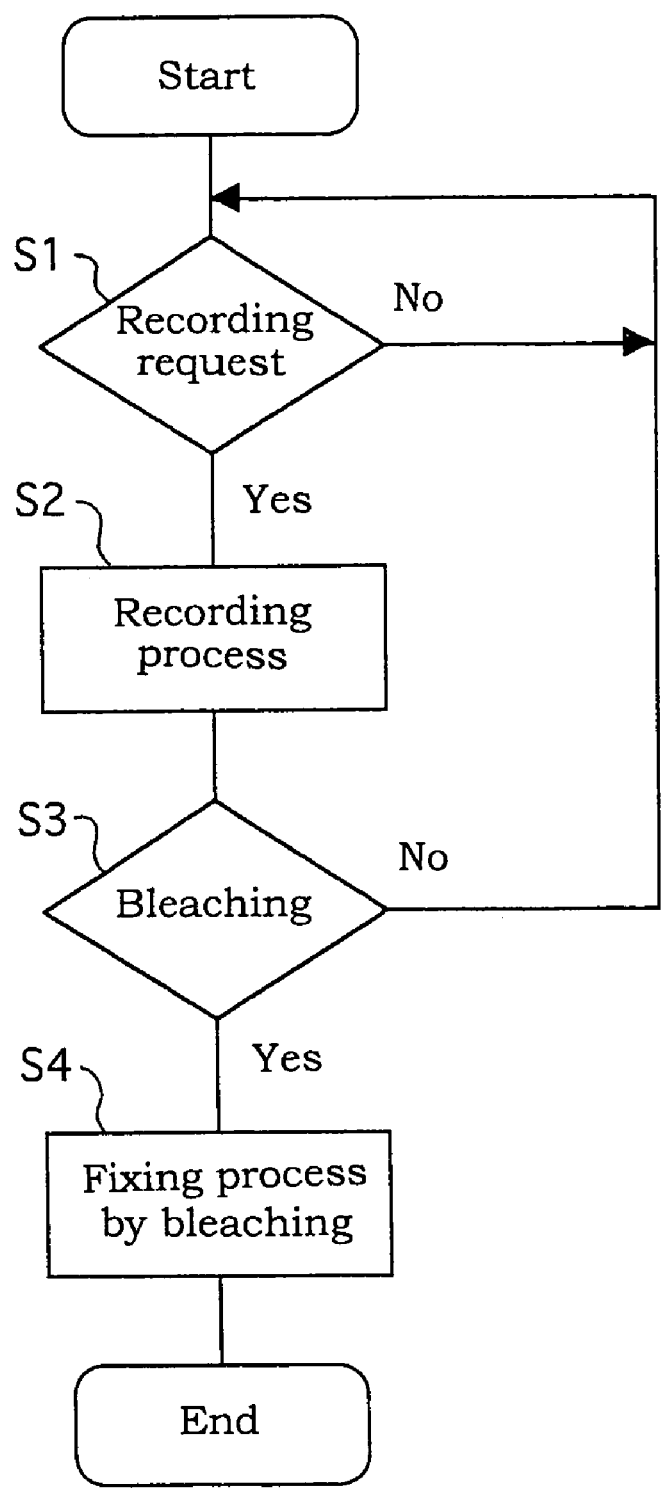
FIG. 15 is a flowchart showing a recording process and a bleaching process according to the present invention.

FIG. 15 shows a schematic flowchart of the recording process and the bleaching process according to the present invention.

In a case the holographic recording medium according to the present invention is a transportable medium like a conventional CD-ROM or DVD-R, when the medium according to the present invention is inserted into the recording and reproducing device and a recording command is transferred to the recording and reproducing device from a higher-order device such as a personal computer connected to the recording and reproducing device, a recording process is started.

The flowchart shown in FIG. 15 shows details of the process in the recording and reproducing device.

This recording process is executed by a microcomputer having a CPU and the like mounted on the recording and reproducing device.

It is determined whether the recording command is provided from the higher-order device or not in step S1 in FIG. 15 and if the command is not provided, the step S1 is repeated. When the recording command of data is provided, the operation proceeds to step S2 where information (address, data to be recorded and the like) contained in the command is examined and a predetermined recording process is performed in the holographic recording medium.

Although the recording to the holographic recording medium has a feature in that multiplex recording is performed to a two-dimensional region in general, a method of performing multiplex recording to the same physical region includes an angle multiplex method or a shift multiplex method. For example, according to the shift multiplex method, while a part of a prior recording spot and a part of the next recording spot are overlapped, the recording is performed, shifting the recording spot sequentially.

According to the present invention, when the recording spot is shifted, the position of the recording spot is controlled so that it may be shifted within one recording zone and it may not be shifted beyond the recording zone.

In other words, the position of the optical component for recording is controlled so that the reference light or the information light may not proceed to the adjacent zone beyond the light shielding wall 34 according to the present invention.

Figure 13:
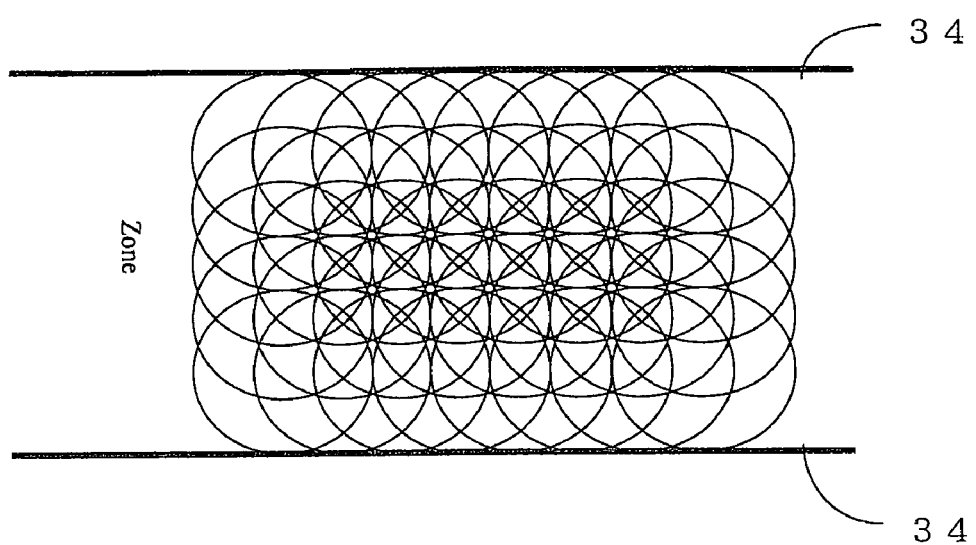
FIG. 13 is an explanatory diagram showing an embodiment of multiplex recording of holographic data according to the present invention.

FIG. 13 shows an embodiment of a movement range of the recording spot in the shift multiplex method according to the present invention.

Here, one circle corresponds to the recording spot and the recording spot can be moved around in one zone only.

Figure 14:
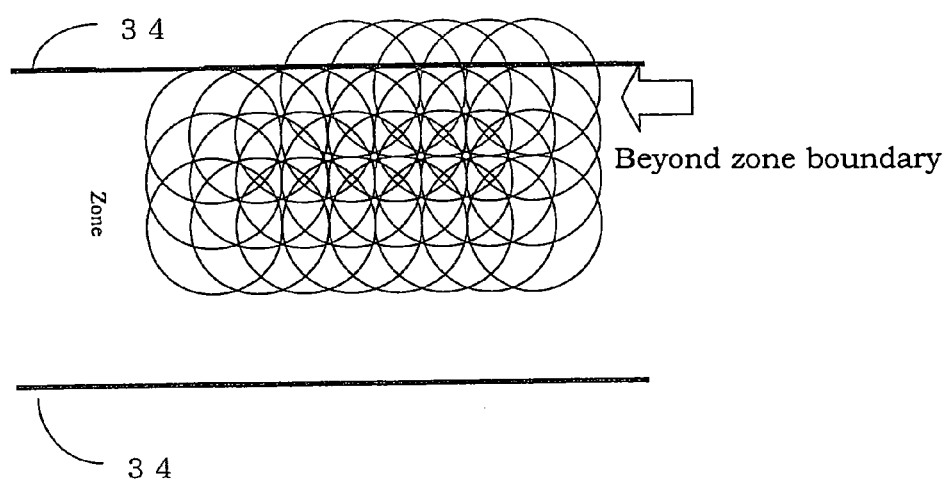
FIG. 14 is an explanatory diagram showing a prohibited embodiment of multiplex recording of holographic data according to the present invention.

FIG. 14 shows a recording method which is not employed in the present invention. That is, the position of the recording spot is controlled so that the recording spot may not extend across the light shielding wall 34 between adjacent zones.

When the recording spot is controlled as shown in FIG. 13, data is prevented from being recorded in the adjacent zone to which data is not to be recorded. In addition, in the bleaching process as will be described below, the position of the light spot of the bleaching light is also controlled like in FIG. 13.

The recording process in step S2 may be almost the same as the recording process in the conventional holographic material layer.

For example, the following processes are sequentially performed:

(1) a process for physically moving a component for recording, in which a position of the recording component is controlled so that a physical position of the medium indicated by the recording command may be irradiated with the recording spot, (2) a process for preparing a recording process, in which an encoding process and the like is performed to the data to be recorded so that the data is converted to a form to be recorded in the medium actually, (3) a holographic recording process in which the reference light and the information light are applied to a predetermined position of the medium, (4) a verifying process or a rewriting process to confirm whether the recording is performed normally or not, and (5) a process such as a completion noticing process to inform the higher-order device of the completion of the commanded recording.

However, according to the present invention, in the media shown in FIGS. 10A, 10B, 11A, 11B and 12A, 12B, the light shielding member is controlled as shown in FIGS. 10B, 11B and 12B in the preparing process (2) among the above series of processes so that the holographic material layer 33 of the zone in which data is to be recorded may be irradiated with the light. For example, according to the medium shown in FIG. 11, when the zone B is the recording region, the light shielding member 41B which covers the zone B is slid in the right direction.

It is determined whether the bleaching is to be performed or not in step S3 in FIG. 15.

When it is not, the operation is returned to the step S1. When the bleaching is to be performed, the operation proceeds to step S4.

The case it is determined that the bleaching is to be performed is as follows:

(a) a case the holographic recording medium is changed according to a specific operation of a user, (b) a case a bleaching command for a specific recording zone is received from the higher-order device by an input of the user, and (c) a case a zone runs out of free space as a result of confirming the present recorded capacity in each zone, or a case remaining capacity is less than a predetermined value (remaining capacity<recorded capacity×1%, for example).

Although the present invention is not limited to the above three cases, when any case among the three cases is generated, the bleaching process s performed in step S4.

Figure 16:
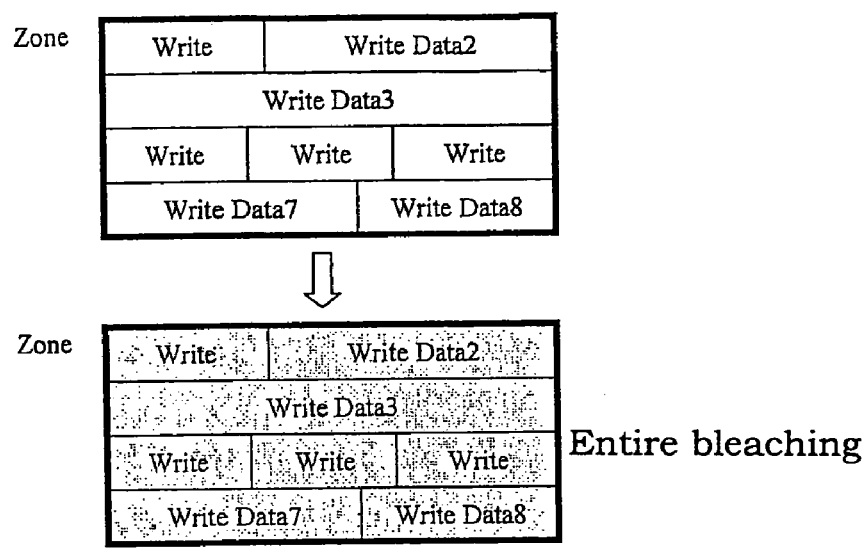
FIG. 16 is an explanatory diagram of bleaching of a recording zone according to the present invention.
Figure 17:
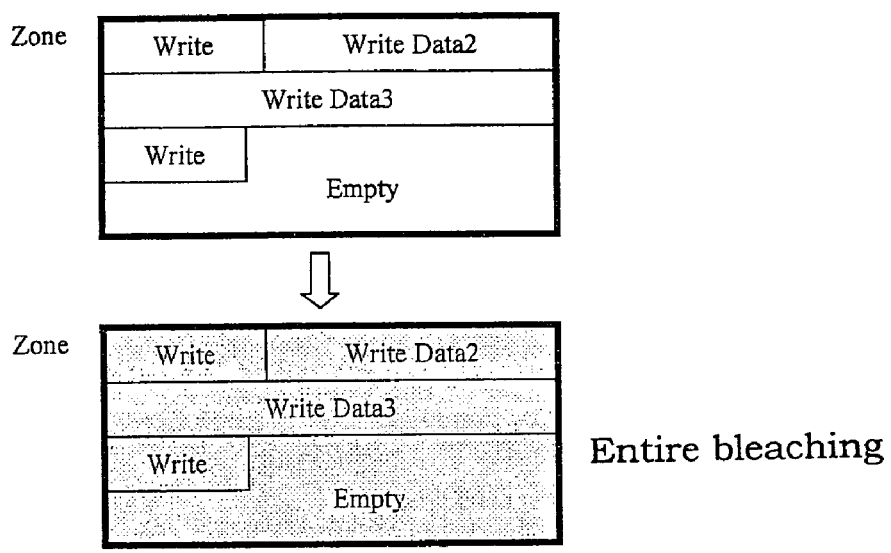
FIG. 17 is an explanatory diagram of bleaching of a recording zone according to the present invention.

FIGS. 16 and 17 are views to explain an embodiment in which the bleaching process is to be performed.

FIG. 16 shows a case the multiplex recording process have been carried out eight times for one zone and entire capacity in the zone is used and recording cannot be performed any more. In this case, it is confirmed that the entire zone is used, so that the bleaching process for the entire zone, that is, the fixing process for the recorded data is performed.

FIG. 17 shows a case the bleaching process is performed by a bleaching command from the user although there is still free capacity (empty region) in the zone. After the bleaching process, data cannot be recorded in the empty region any more.

In step S4 shown in FIG. 15, the target recording zone of the medium is irradiated with the bleaching light as shown in FIG. 1B or FIG. 23 to perform the bleaching process.

Here, as described in FIGS. 1B, 5B and 13, the position of the optical component of the recording and reproducing device is controlled so that only the recording zone in which the data is to be fixed is irradiated with the bleaching light and the adjacent zone is not irradiated with the bleaching light.

Since the holographic recording medium according to the present invention includes the light shielding wall 34 shown in FIG. 1, when the recording process and the bleaching process are performed as shown in FIG. 15, the light for the recording process or the bleaching light is not diffused in the unrecorded region, so that the recording and reproducing SNR can be improved and more stable recording and reproducing characteristics are implemented.

(Embodiment of Manufacturing Method of the Medium According to the Present Invention)

The same manufacturing method as the conventional method may be used for the holographic recording medium according to the present invention except for a step of providing the light shielding wall 34.

For example, the resin substrate 32 provided with the reflection film 31 is manufactured by spattering the reflection film 31 formed of a material such as aluminum or aluminum chrome or silver to the entire of the resin substrate 32 formed of acrylic material.

Then, as shown in FIG. 1, the substrate 30 formed of glass or polycarbonate is prepared and the substrate 30 and the resin substrate 32 are adhered to each other through an adhesive such as UV cure resin and the like.

Figure 18:
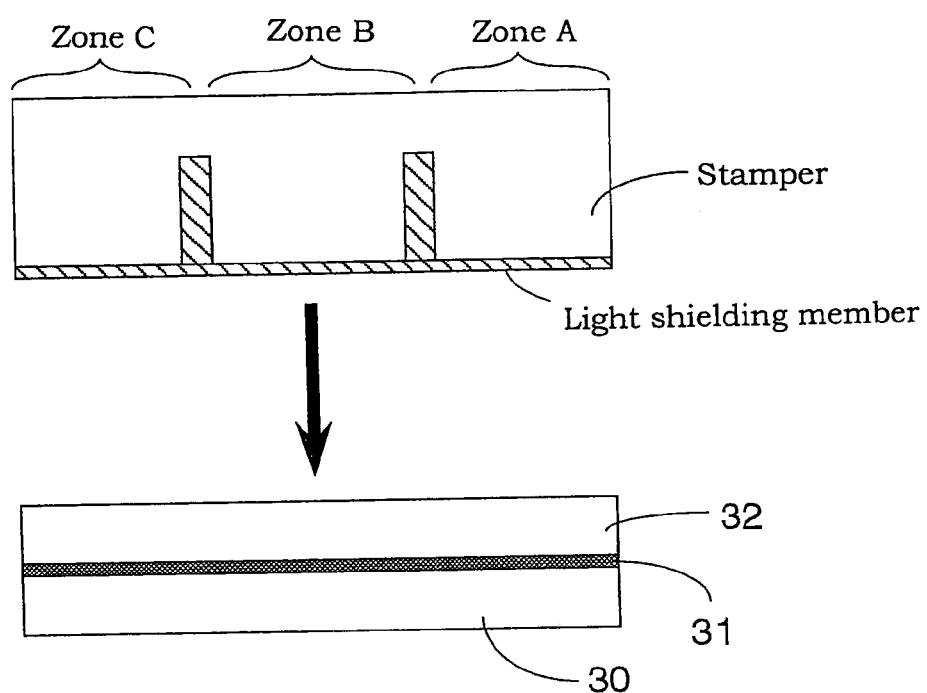
FIG. 18 is an explanatory view showing a manufacturing method of a holographic recording medium according to the present invention.

Then, as shown in FIG. 18, a stamper in which a recessed pattern is provided to form the long and thin light shielding member corresponding to the light shielding wall 34 is prepared and a colored acrylic resin is applied to the recessed pattern surface of the stamper and stretched by a spin coating or blade method, to form the light shielding member corresponding to the light shielding wall 34 on the stamper. Then, a surface of the light shielding member on the stamper and the face of the substrate 32 provided with the reflection film and the substrate 30 are opposed and adhered by an anaerobic adhesive or a UV combined anaerobic adhesive or the like.

Figure 19:
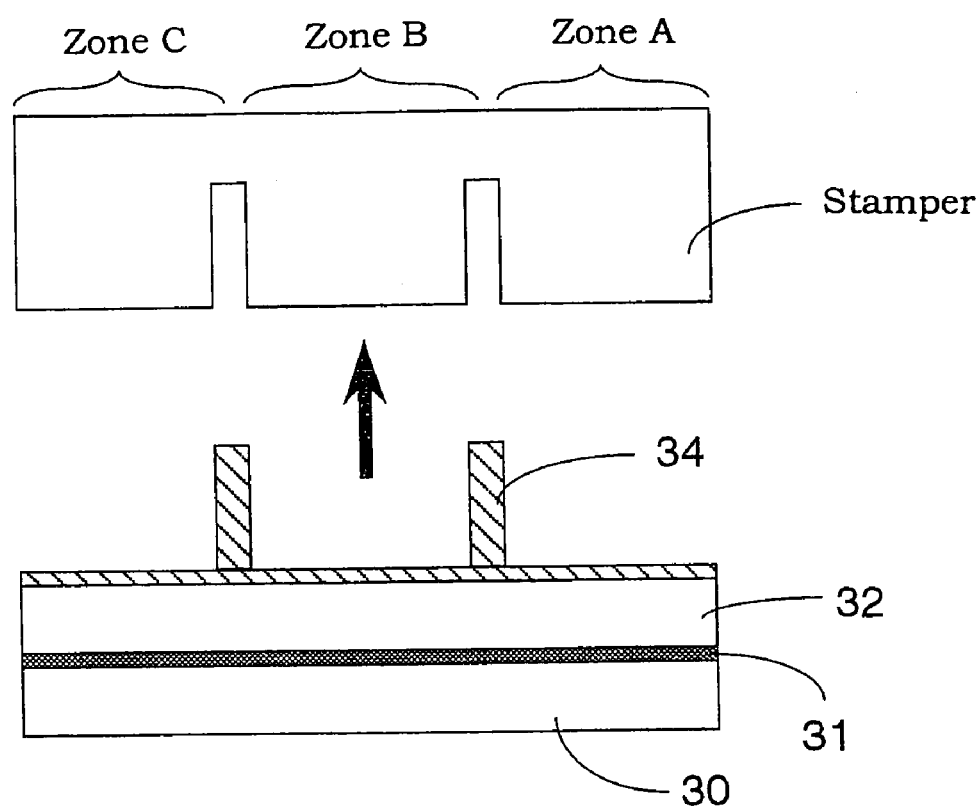
FIG. 19 is an explanatory view showing the manufacturing method of the holographic recording medium according to the present invention.

Then, as shown in FIG. 19, when the light shielding member is removed from the stamper, the structure in which the light shielding wall 34 is formed on the substrate 32 can be provided.

Figure 20A:
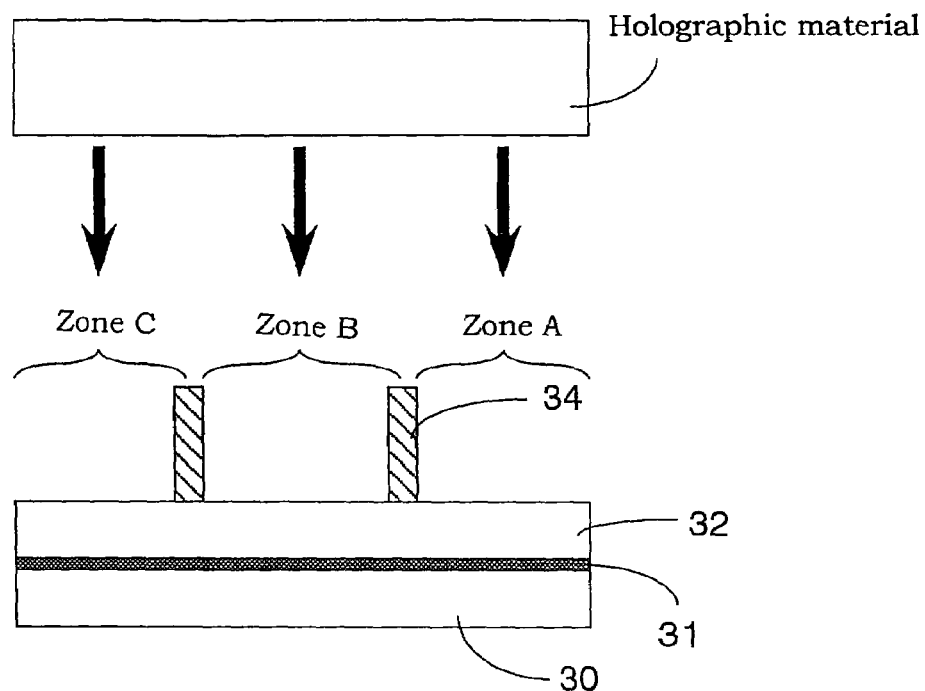
FIGS. 20A and 20B are explanatory views each showing the manufacturing method of the holographic recording medium according to the present invention.
Figure 20B:
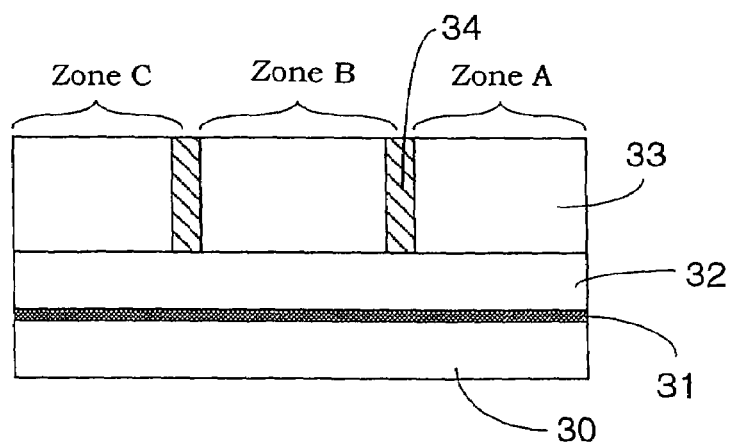

Then, as shown in FIG. 20A, the holographic material 33 which is semisolid or has viscosity such as (meta)acrylate, styrene, vinyl ether, epoxy and the like is poured into the zones A, B and C shown in FIGS. 1A and 1B. Thus, the holographic recording medium shown in FIG. 1A is completed (refer to FIG. 20B). However, this manufacturing method is an example and the present invention is not limited to this.

In addition, as shown in FIGS. 5A and 5B, when the waveguide layer 35 is formed, before the light shielding wall 34 is formed, a transparent material such as acrylic or olepin material is applied to the surface of the substrate 32 to form the waveguide layer.

According to the present invention, since the holographic material layer is divided into the plurality of recording zones by the light shielding walls which do not transmit the bleaching light, the bleaching light applied to a certain recording zone can be prevented from being diffused or proceeding to its adjacent recording zone.

In addition, when the adjacent recording zone is an unrecorded region, the bleaching light is not diffused in that unrecorded region. Thus, when data is recorded in the unrecorded region in the future, the SNR at the time of recording and reproducing is improved and substantial recording and reproducing characteristics can be improved. Furthermore, the substantially intended recording capacity can be assured and the same data management method as in the conventional storage can be employed.

What is claimed is:

1. A holographic recording medium comprising:
    a holographic material layer in which information is to be recorded by irradiating the same region with information light corresponding to the information to be recorded and reference light to read the recorded information,
    wherein the holographic material layer is divided into a plurality of recording zones by a plurality of light shielding walls, the light shielding wall is formed of a material which does not transmit bleaching light irradiated for fixing the recorded information to the recording zone in which a recording process has been performed, the holographic material layer is formed on a disk-shaped or polygonal substrate, the light shielding wall is formed on the substrate and in the holographic material layer, a waveguide layer to introduce the bleaching light is provided between the substrate and the holographic material layer, and the waveguide layer is formed so that the applied bleaching light is led to each recording zone of the holographic material layer.

2. A holographic recording medium comprising:

a holographic material layer in which information is to be recorded by irradiating the same region with information light corresponding to the information to be recorded and reference light to read the recorded information, wherein the holographic material layer is divided into a plurality of recording zones by a plurality of light shielding walls, and the light shielding wall is formed of a material which does not transmit bleaching light irradiated for fixing the recorded information to the recording zone in which a recording process has been performed, and further comprising:

a light shielding member provided on the holographic material layer and the light shielding wall, wherein the light shielding member is any one of a thin film which can be removed from/attached to each recording zone, a movable member which can control permission and prohibition of light proceeding to the holographic material layer in each recording zone, and a liquid crystal element which can vary light transmission to the holographic material layer in each recording zone.

* * * * *